(12) United States Patent
Eberspach

(10) Patent No.: US 7,367,183 B2
(45) Date of Patent: May 6, 2008

(54) INTERNAL COMBUSTION ENGINE WITH A FUEL REFORMER AND AMMONIA GENERATOR

(75) Inventor: Günter Eberspach, Wolfschlugen (DE)

(73) Assignee: J. Eberspaecher GmbH & Co. (DE)

( * ) Notice: Subject to any disclaimer, the term of this patent is extended or adjusted under 35 U.S.C. 154(b) by 0 days.

(21) Appl. No.: 11/153,675

(22) Filed: Jun. 15, 2005

(65) Prior Publication Data
US 2005/0274331 A1 Dec. 15, 2005

(30) Foreign Application Priority Data
Jun. 15, 2004 (DE) ............... 10 2004 028 651

(51) Int. Cl.
*F01N 3/00* (2006.01)
(52) U.S. Cl. .............. 60/286; 60/295; 60/301; 60/303; 123/1 A; 123/DIG. 12
(58) Field of Classification Search ............ 60/274, 60/275, 286, 295, 297, 300, 301, 303; 123/1 A, 123/3, DIG. 12
See application file for complete search history.

(56) References Cited

U.S. PATENT DOCUMENTS

| 2,140,254 | A | * | 12/1938 | Zavka | .................. | 123/545 |
| 6,655,130 | B1 | * | 12/2003 | Kirwan et al. | ................ | 60/284 |
| 6,662,552 | B1 | * | 12/2003 | Gunther et al. | ............... | 60/286 |
| 6,739,125 | B1 | * | 5/2004 | Mulligan | .................... | 60/286 |
| 6,832,473 | B2 | * | 12/2004 | Kupe et al. | .................... | 60/286 |
| 6,871,491 | B2 | * | 3/2005 | Breuer et al. | ................ | 60/286 |
| 7,293,409 | B2 | * | 11/2007 | Sellnau et al. | ............... | 60/286 |
| 2004/0020191 | A1 | * | 2/2004 | Kramer | ...................... | 60/286 |
| 2004/0159096 | A1 | * | 8/2004 | Yasui et al. | ................... | 60/286 |
| 2005/0138916 | A1 | * | 6/2005 | Bonadies et al. | ............ | 60/275 |
| 2005/0247050 | A1 | * | 11/2005 | Kaboord et al. | ............. | 60/286 |
| 2006/0075743 | A1 | * | 4/2006 | Li et al. | ...................... | 60/286 |
| 2007/0271908 | A1 | * | 11/2007 | Hemingway et al. | ......... | 60/286 |

FOREIGN PATENT DOCUMENTS

| DE | 10135643 | | 2/2003 |
| DE | 10203034 | | 7/2003 |
| DE | 10219799 | | 11/2003 |
| JP | 02157464 | A * | 6/1990 |
| JP | 05332152 | A * | 12/1993 |

* cited by examiner

Primary Examiner—Tu M. Nguyen
(74) Attorney, Agent, or Firm—Howard IP Law Group

(57) ABSTRACT

The present invention relates to an internal combustion engine which is used in particular in motor vehicle having a reformer for generating hydrogen, whereby the reformer has a single operating mode in which it generates as much reformate as needed or even more for purification of the maximum quantity of exhaust gas generated, whereby a distributor apparatus is situated at the output end of the reformer and the distributor apparatus is connected at the output end to an intake train of the internal combustion engine and to an ammonia generator, whereby the ammonia generator is connected at the output end upstream from an SCR catalyst to an exhaust train of the internal combustion engine, whereby the distributor apparatus allocates the reformate between the intake train and the ammonia generator as a function of the operating state of the internal combustion engine.

8 Claims, 1 Drawing Sheet

US 7,367,183 B2

INTERNAL COMBUSTION ENGINE WITH A FUEL REFORMER AND AMMONIA GENERATOR

CLAIM FOR PRIORITY

Figure 1:
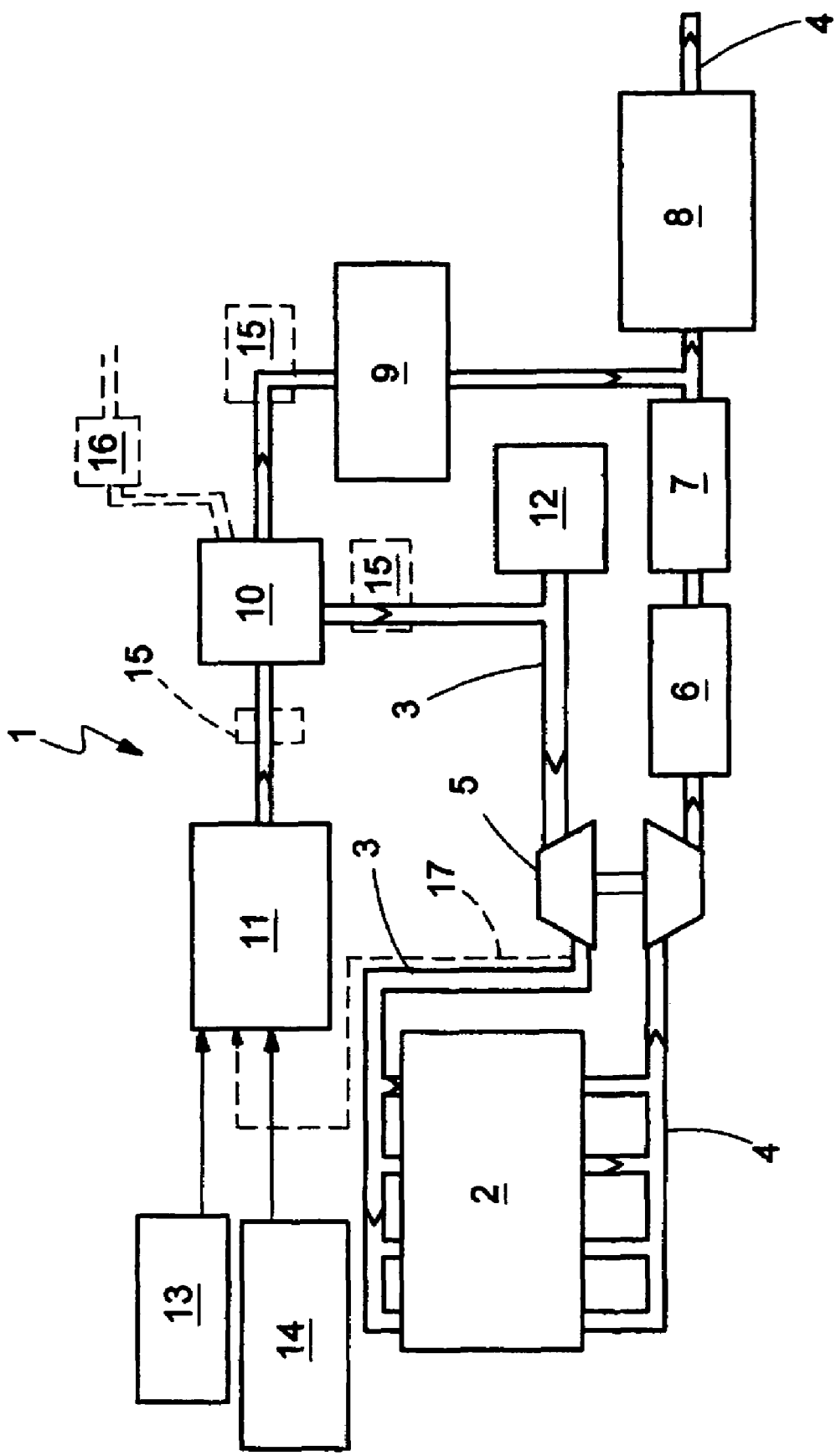

This application claims the benefit of German Application No. DE 10 2004 028 651.5, filed Jun. 15, 2004 and is incorporated herein by reference.

BACKGROUND OF THE INVENTION (1) Field of the Invention

The present invention relates to an internal combustion engine, in particular in a motor vehicle, having a reformer for generating hydrogen.

(2) Description of Related Art

It is known in general that reformers may be used in aftertreatment of exhaust gas, in particular diesel engine exhaust gas. Their function is to generate hydrogen, which is converted to ammonia, for example, in additional steps. To do so, fuel, e.g., diesel, is mixed with air and enters an autothermal reactor that operates mostly without external heating. A gas mixture comprised mainly of hydrogen, carbon dioxide, nitrogen and water is formed there at approximately 700° C. Ammonia produced from hydrogen in additional steps can convert the nitrogen oxides present in the exhaust into harmless nitrogen and water in a catalytic converter (SCR catalyst, where SCR stands for selective catalytic reduction) designed specifically for this purpose. It is known in general here that such reformers may be positioned in the full stream, in a substream (bypass) or between the intake and exhaust sides of the engine.

BRIEF SUMMARY OF THE INVENTION

The present invention is concerned with the problem of providing an improved embodiment for an internal combustion engine having a reformer of the type mentioned in the preamble; this embodiment also reliably includes in particular fast and high load spreads of the dynamically operated internal combustion engine and can nevertheless be implemented economically.

This problem is solved according to the present invention by the object of the independent claim. Advantageous embodiments are the object of the dependent claims.

The present invention is based on the general idea of providing a reformer for generating hydrogen for an internal combustion engine, said reformer having a single operating mode in which it generates as much reformate or more than needed for purification of the maximum quantity of exhaust gas. A distributor apparatus situated at the output end of the reformer is connected at its output to an intake train of the internal combustion engine and also to an ammonia generator. At the output end, the ammonia generator is connected upstream from an SCR catalyst to an exhaust train of the internal combustion engine. The distributor apparatus divides the reformate between the intake train and the ammonia generator (depending on the operating state of the internal combustion engine).

The reformer has only a single operating mode, so the distributor apparatus connected downstream from it can control very rapid and very high load spreads due to a demand-oriented allocation of the reformate between the intake train and the ammonia generator as a function of the operating state of the internal combustion engine. Reformate is always available in sufficient quantity for purification of the exhaust gas, so that nitrogen oxide emissions by the dynamically operated internal combustion engine can be followed only through demand-oriented allocation of reformate between the exhaust train and the intake train. In addition, the inventive arrangement and design of the reformer and/or the distributor apparatus can adapt to sudden great changes in pressure, a respective educt supply being ensured in all operating states, i.e., even during load peaks, in particular in an exhaust system with a particulate filter. Due to the constant generation of reformate, a simplified mode of operation is achieved, so that a simpler embodiment of the reformer and/or a supply of air and fuel can be achieved. In a lower load range in which the reformer generates more reformate than needed for purification of the exhaust gas, the reformate stream not needed is supplied to the intake train of the internal combustion engine and thus converted to mechanical power through combustion in the internal combustion engine, so that essentially no increase in consumption is to be expected in comparison with a modulable reformer when this is taken into account accordingly in the fuel supply to the internal combustion engine.

The reformer is expediently a partial oxidation reformer (POX reformer). Such POX reformers have long been used successfully, improving the cold start performance of an internal combustion engine, thus permitting a more protective engine warm-up.

According to an advantageous embodiment of the inventive approach, a cooler is provided between the reformer and the distributor apparatus and/or between the distributor apparatus and the ammonia generator and/or between the distributor apparatus and the intake train. The cooler is preferably tied into a heating circuit for heating the internal combustion engine and/or heating an interior space of a vehicle equipped with said internal combustion engine and/or heating an oxidation catalyst of the exhaust train in a cold start. The cooler is preferably tied into a heating circuit for heating the internal combustion engine and/or an interior of a vehicle equipped with said internal combustion engine and/or an oxidation catalyst of the exhaust train in a cold start. Placing the cooler between the reformer and the distributor apparatus according to the first alternative makes it possible to heat the reformate generated in the reformer to the optimum temperature for downstream process steps such as generation of ammonia. At the same time, the heated reformate is already supplied to the distributor apparatus, so that it can be allocated at the optimum temperature between the exhaust train and the intake train of the internal combustion engine.

In an advantageous embodiment of the inventive approach, the reformate is introduced into the intake train upstream from a charger. The reformate, which is generated in the reformer and is additionally heated correctly, for example, is therefore introduced in a demand-oriented process into the intake train of the internal combustion engine. For example, a fluid-driven turbocharger, driven by combustion exhaust gases, or a mechanically driven compressor may be provided as the charger, each of these having the function of compressing the fresh air intake and supplying it in compressed form to the internal combustion engine.

Additional important features and advantages of this invention are derived from the subclaims, the drawing and the respective description of the figures with reference to the drawing.

It is self-evident that the features mentioned above and those to be explained in greater detail below may be used not only in the particular combination given but also in other combinations or alone without going beyond the scope of the present invention.

A preferred exemplary embodiment of this invention is depicted in the drawings and explained in greater detail in the following description.

BRIEF DESCRIPTION OF THE DRAWING(S)

FIG. 1, the only figure, shows an internal combustion engine having a reformer designed and arranged according to this invention.

DETAILED DESCRIPTION OF THE INVENTION

According to FIG. 1, an internal combustion engine 1 has an engine or an engine block 2 with an intake train 3 connected to it at the input end and an exhaust train 4 connected to it at the output end. The internal combustion engine 1 may be installed in a motor vehicle (not shown) and/or may drive such a motor vehicle. A charger 5, designed here as an exhaust gas turbocharger tied into the exhaust train 4 at the drive end accordingly, is preferably situated in the intake train 3. Alternatively, the charger 5 may be designed as a mechanical charger, e.g., a compressor driven by the internal combustion engine 1. The charger 5 serves in a known way to compress fresh air supplied to the engine block 2, thus permitting an increase in the power and efficiency of the internal combustion engine 1.

Downstream from the charger 5, an oxidation catalyst 6 may be situated in the exhaust train 4, resulting in purification of the exhaust gas in the form of decreasing the carbon monoxide and hydrocarbon emissions by oxidizing these substances to carbon dioxide and water.

At the output end of the oxidation catalyst 6, a particulate filter 7, in particular a soot filter, may be situated downstream in the exhaust train 4, filtering the exhaust gas to remove the fine particles, in particular soot particles, from the exhaust gas, thus preventing their release. Further downstream in the exhaust train 4, an SCR catalyst 8 may be situated downstream from the particulate filter 7 to reduce the nitrogen oxides present in the exhaust gas to water and nitrogen. Ammonia is also needed for chemical reduction of nitrogen oxides to water and nitrogen; according to FIG. 1, ammonia is generated by an ammonia generator 9 and added to the exhaust train 4 upstream from the SCR catalyst 8, expediently downstream from the particulate filter 7.

The ammonia generator 9 is connected at the input end to an output end of a distributor apparatus 10, which has the job of dividing the reformate stream between the ammonia generator 9, i.e., between the exhaust train 4 at one end, and the intake train 3 at the other end in a demand-oriented process.

To do so, the distributor apparatus 10 is flow-connected at the input end to an output end of a reformer 11 and at the output end is connected to both the intake train 3 as well as the ammonia generator 9 and by way of the latter also to the exhaust train 4. The reformer 11 is designed to generate hydrogen, which is converted to ammonia, for example, in ammonia generator 9 in subsequent steps. The starting materials, namely air and fuel, needed to generate the reformate, i.e., hydrogen, are supplied to the reformer 11 by a fan 13 and a fuel supply 14 according to FIG. 1.

In contrast with controllable and/or modulable reformers of the traditional output, which must be capable of handling very rapid and very large load spreads because they must adjust to the nitrogen oxide emissions of the dynamically operated internal combustion engine, the reformer 11 with the inventive internal combustion engine 1 has only a single operating mode in which it generates as much reformate as needed or even more for the maximum quantity of exhaust gas produced. The distributor apparatus 10 has the function of distributing the reformate between the intake train 3 and the ammonia generator 9 as a function of the operating state of the internal combustion engine. The advantage is the simplified static mode of operation due to the constant generation of reformate in addition to a simpler and thus less expensive design of the reformer 11 and/or the fan 13 and the fuel supply 14. The (sub)stream of the reformate not needed for exhaust gas purification is converted to mechanical power by combustion in the engine block 2, so there is no increase in consumption in comparison with a modulating reformer if the reformate feed is taken into account accordingly during operation of the fuel injection system. The distributor apparatus 10 is therefore suitably coupled to a corresponding control (not shown here) of the injection system.

The reformer 11 may be designed, for example, as a partial oxidation reformer (POX reformer). Such a POX reformer oxidizes the hydrocarbons present in the fuel in a catalytic or thermal reaction together with atmospheric oxygen to form hydrogen, carbon monoxide and carbon dioxide. The energy required to accomplish this is normally supplied by combustion (oxidation) of a portion of the hydrocarbons in the process itself.

According to another embodiment of the inventive approach, it is conceivable for a cooler 15 to be provided between the reformer 11 and the distributor apparatus 10 and/or between the distributor apparatus 10 and the ammonia generator 9 and/or between the distributor apparatus 10 and the exhaust train 3. Since this is an optional approach, the cooler 15 is shown with broken lines in FIG. 1. The cooler 15 may be tied into a heating circuit (not shown) for heating the internal combustion engine 1 and/or heating an interior of a vehicle equipped with said internal combustion engine 1 and/or an oxidation catalyst 6 of the exhaust train 4 in a cold start. The "heating circuit" is expediently the "cooling circuit" of the internal combustion engine 1, which is already provided anyway, for cooling the engine block 2 during hot operation. The cooler 15 between the distributor apparatus 10 and the ammonia generator 9 may be used for heating the reformate stream discharged from the distributor apparatus 10 to the ammonia generator 9.

Additionally or alternatively, the distributor apparatus 10 may also be connected at the output end to a burner 16, the reformate then being distributed among the intake train 3, the ammonia generator 9 and the burner 16 as a function of the operating state of the internal combustion engine 1. It is conceivable here for some or all of the reformate stream to be supplied to the burner 16 in a cold start and to be burned there and for the resulting heat of combustion to be supplied via a heat exchanger (cooler) to an appropriate heating circuit for heating the engine block 2 and/or the internal combustion engine 1 and/or a vehicle equipped with such an internal combustion engine 1. High nitrogen oxide emissions usually do not occur in a cold start of the internal combustion engine 1, so the reformate can be supplied completely to the burner 16 via the respective heat exchanger (not shown).

In another expansion stage (not shown), the system may also be equipped with the burner 16 for auxiliary heating. The burner 16 has the additional advantage that in the case of deceleration of the vehicle, when a release of mechanical power is not desired, the reformate thereby generated can be burned. In winter, this heat of combustion may be utilized to partially or completely compensate for the cooling of the engine cooling circuit, which is often associated with deceleration of a vehicle, e.g., in prolonged downhill driving, and to thereby maintain a high level of heating comfort.

An exhaust gas aftertreatment system, e.g., the catalytic converter 6, may also be heated with the burner 16 or an additional burner (not shown), e.g., in a cold start, so that it rapidly reaches its operating temperature. The burner heat may of course also be used to support regeneration of the particulate filter, if present.

According to an advantageous refinement of the inventive approach, it is also possible to provide for the charger 5 to be used for fresh air supply to the reformer 11. A substream of compressed intake air can be branched off here at the pressure end of the charger 5 and sent to the reformer 11 over a supply line 17. The fan 13 may advantageously then be eliminated and/or replaced by the feed line 17, thus resulting in a simplified design and an inexpensive variant at the same time.

In summary, the essential features of the inventive approach can be characterized as follows:

According to this invention, a reformer 11 having a single operating mode is to be provided with an internal combustion engine such that it generates as much reformate as needed or even more for purification of the maximum quantity of exhaust gas generated. The reformer 11 is flow-connected at the output end to an input end of a distributor apparatus 11, which divides the reformate stream at the output end according to demand, i.e., as a function of the operating state of the internal combustion engine 1, between the intake train 3 and the ammonia generator 9.

The inventive approach offers the advantage of a simple embodiment of the reformer 11 with a simplified mode of operation with constant production of reformate while at the same time converting the portion of the reformate stream not needed for exhaust gas purification into mechanical power by combustion in the internal combustion engine 1. This yields continuous reformer operation in particular without any significant increase in consumption in comparison with a modulating reformer.

The invention claimed is:

1. An internal combustion engine comprising:
   a reformer for generating hydrogen, wherein the reformer has a single operating mode in which it generates a constant amount of reformate, said constant amount being as much or more reformate than needed for purification of the maximum quantity of exhaust gas generated independent of the exhaust gas;
   a distributor apparatus provided at the output end of the reformer, wherein the distributor apparatus is connected at the output end to an intake train of the internal combustion engine and to an ammonia generator; and
   a cooler;
   wherein the ammonia generator is connected to an exhaust train of the internal combustion engine at the output end upstream from an SCR catalyst,
   wherein the distributor apparatus is equipped to divide the reformate between the intake train and the ammonia generator as a function of the operating state of the internal combustion engine; and
   wherein the cooler is tied into a heating circuit for heating at least one of the internal combustion engine; an interior of a vehicle equipped with the internal combustion engine; and an oxidation catalyst of the exhaust train in a cold start.

2. An internal combustion engine comprising:
   a reformer for generating hydrogen, and having an intake and an outlet, wherein the reformer operates in a single mode to generate at least as much reformate needed for purifying the maximum quantity of exhaust gas generated by the internal combustion engine;
   a distributor apparatus, having an intake connected to the outlet of the reformer, and an outlet connected to an intake of the internal combustion engine;
   an ammonia generator having an intake connected to the distributor apparatus outlet, an outlet connected to an exhaust train of the internal combustion engine upstream from an SCR catalyst; and,
   a cooler connected to a heating circuit for heating at least one of the internal combustion engine; an interior of a vehicle equipped with the internal combustion engine; and an oxidation catalyst of the exhaust train in a cold start;
   wherein, the distributor apparatus is equipped to divide the reformate between the intake of the internal combustion engine and the ammonia generator as a function of the operating state of the internal combustion engine.

3. The internal combustion engine according to claim 2, wherein the reformer is a partial oxidation reformer (POX reformer).

4. The internal combustion engine according to claim 2, wherein the distributor apparatus is also connected at the output end to a burner and is adapted to divide the reformate between the intake train, the ammonia generator and the burner as a function of the operating state of the internal combustion engine.

5. The internal combustion engine according to claim 2, wherein the reformer is connected to the intake train at the output end upstream from a charger.

6. The internal combustion engine according to claim 2, wherein due to the ammonia generator, ammonia is introduced into the exhaust train downstream from at least one of an oxidation catalyst and particulate filter.

7. The internal combustion engine according to claim 2, further comprising a cooler.

8. The internal combustion engine according to claim 7, wherein the cooler is tied into a heating circuit for heating at least one of the internal combustion engine; an interior of a vehicle equipped with the internal combustion engine; and an oxidation catalyst of the exhaust train in a cold start.

* * * * *